US011277712B2

(12) United States Patent
Guydouk

(10) Patent No.: US 11,277,712 B2
(45) Date of Patent: Mar. 15, 2022

(54) CELLULAR GLOBAL TRACKER FOR FREIGHT

(71) Applicant: Tatiana Guydouk, Plantation, FL (US)

(72) Inventor: Tatiana Guydouk, Plantation, FL (US)

(*) Notice: Subject to any disclaimer, the term of this patent is extended or adjusted under 35 U.S.C. 154(b) by 0 days.

(21) Appl. No.: 17/129,184

(22) Filed: Dec. 21, 2020

(65) Prior Publication Data

US 2021/0195378 A1    Jun. 24, 2021

Related U.S. Application Data

(60) Provisional application No. 62/951,708, filed on Dec. 20, 2019.

(51) Int. Cl.
*H04W 24/00* (2009.01)
*H04W 4/029* (2018.01)
*H04W 52/02* (2009.01)

(52) U.S. Cl.
CPC ....... *H04W 4/029* (2018.02); *H04W 52/0241* (2013.01)

(58) Field of Classification Search
CPC .................................................... H04W 4/021
USPC ................... 455/456.1, 572, 41.2, 343.2
See application file for complete search history.

(56) References Cited

U.S. PATENT DOCUMENTS 10,504,349 B2 * 12/2019 Benson ................ G07G 1/0036
10,881,926 B1 *  1/2021 Hill ........................ A63B 53/04
2008/0015421 A1 *  1/2008 Penner ................ A61B 5/14539
                                                                600/300
2009/0321304 A1 * 12/2009 Watson .................... B65D 75/24
                                                                206/703
2014/0240125 A1 *  8/2014 Burch ..................... G06Q 10/06
                                                                340/539.13
2017/0366889 A1 * 12/2017 Schipper ................... H04R 1/04
2018/0033330 A1 *  2/2018 Darmour ................. A61B 5/318

OTHER PUBLICATIONS

Keystone Electronics Keystone Electronics Corp. RoHS Compliant ~ ISO 9001:2015 Certified 55 S Denton Ave. • New Hyde Park, NY 11040 • Tel: (516) 328-7500. May 28, 2017.*

* cited by examiner

*Primary Examiner* — Joseph Arevalo
(74) *Attorney, Agent, or Firm* — Mark Terry

(57) ABSTRACT

A device for tracking freight includes a housing configured for attachment to freight, adhesive disposed on one side of the housing, the adhesive configured for attachment to freight, a cellular network transmitter/receiver located within the housing, a global positioning system (GPS) processor for collecting location data about the device, the GPS processor located within the housing, a temperature sensor for collecting temperature data, the sensor located within the housing, a processor communicatively coupled with the cellular network transmitter/receiver, the GPS processor and the temperature sensor, the processor configured for reading said location data and said temperature data and transmitting said location data and said temperature data via the cellular network transmitter/receiver, and, a power source comprising a battery, the power source conductively coupled to the processor, the cellular network transmitter/receiver, the GPS processor and the temperature sensor.

12 Claims, 6 Drawing Sheets

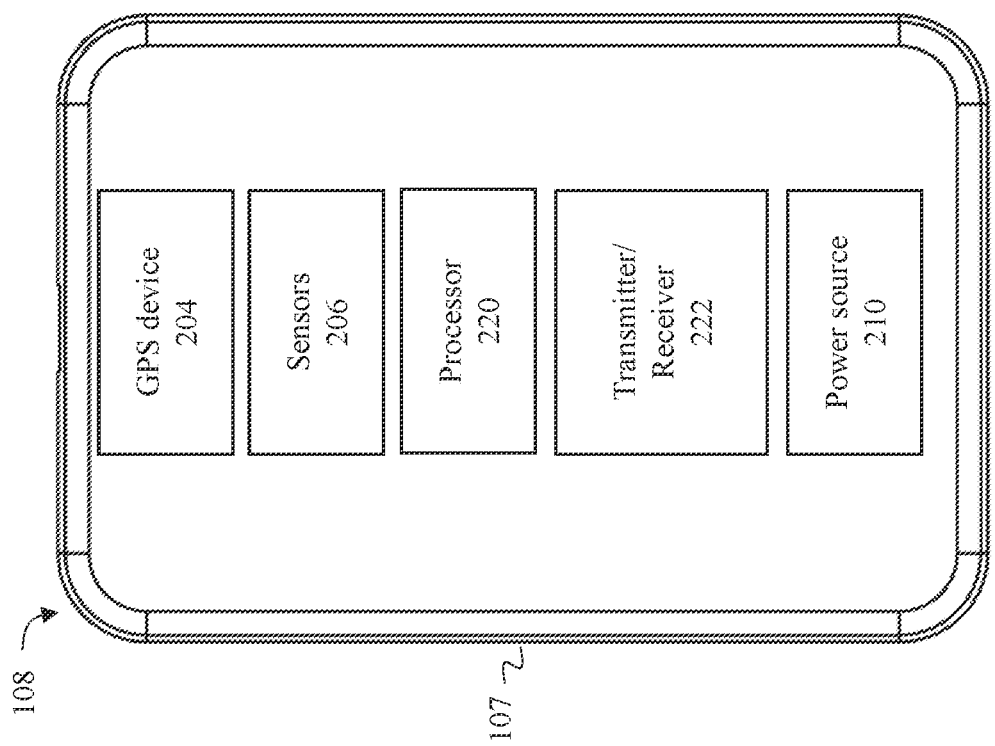

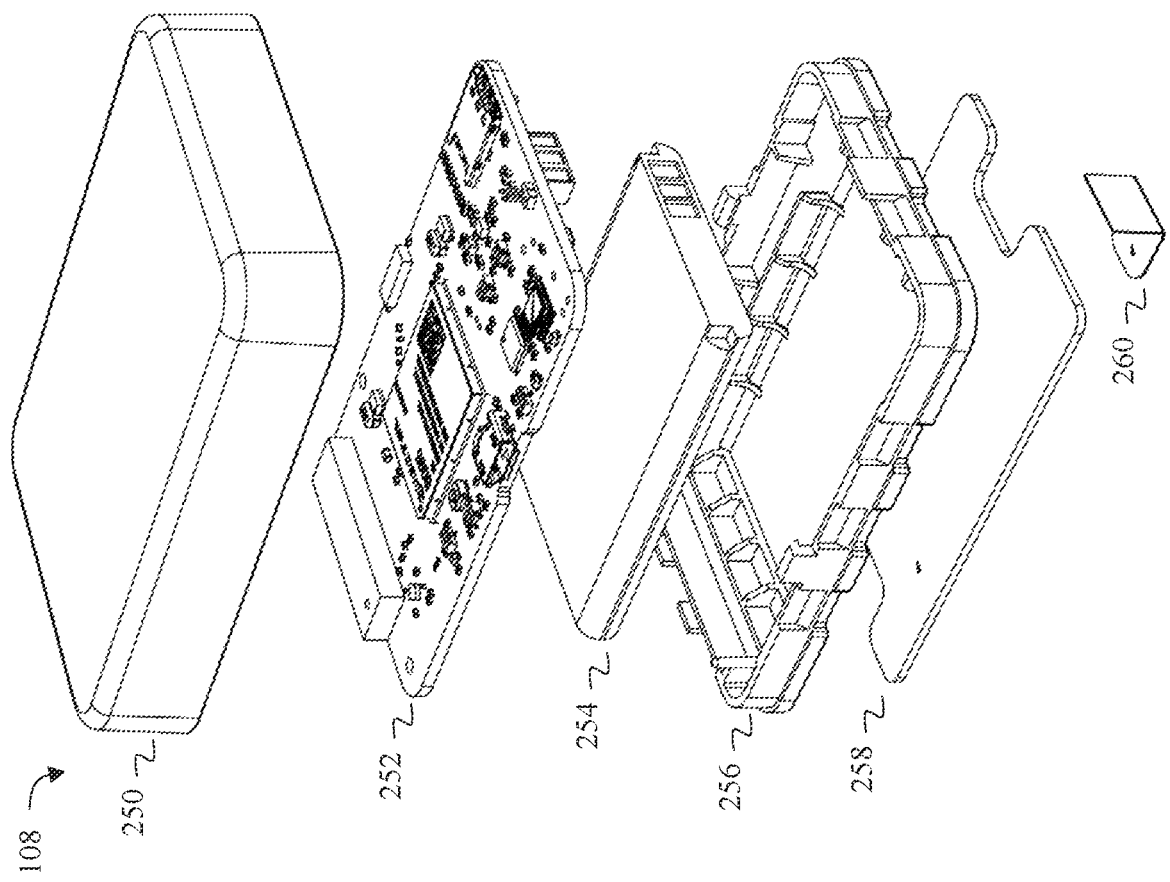

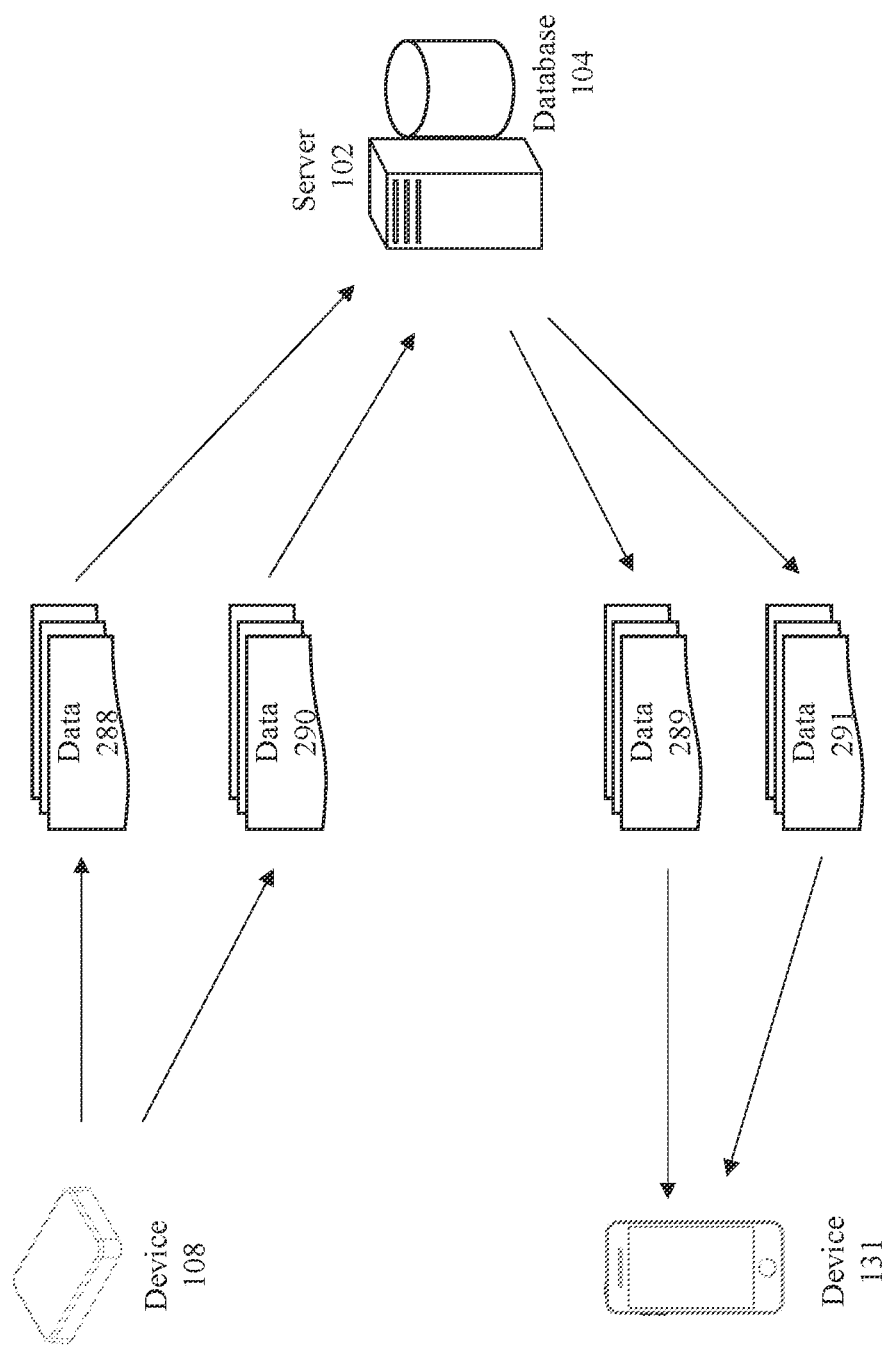

CELLULAR GLOBAL TRACKER FOR FREIGHT

CROSS-REFERENCE TO RELATED APPLICATIONS

This patent application claims priority to provisional application No. 62/951,708, filed Dec. 20, 2019 and titled "Cellular Global Tracker for Freight." The subject matter of provisional application No. 62/951,708 is incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The claimed device relates to the field of freight transport, and more specifically to the field of tracking freight as it is transported to different locations.

BACKGROUND

Freight transport is the physical process of transporting commodities, merchandise goods and cargo. The freight transport industry accounts for a considerable portion of the labor force and revenue stream worldwide. Ground, air and sea travel move goods efficiently, which appeals to merchants who depend upon reliable and timely shipments to satisfy the growing demand for shipping from consumers. One of the problems associated with freight transport is keeping track of freight. Although transportation companies often keep track of what is loaded onto, or off-loaded from, a carrier, freight is not usually tracked during transport (though the equipment used to transport, such as the truck or trailer, may be tracked). This leaves a large gap in the information that merchants have about the current location of their freight. Consequently, freight is often lost or misplaced during transport, which can be costly and time consuming for merchants to deal with. Another problem associated with freight transport is keeping track of the temperature of the freight, since certain freight, such as produce, must be kept at a particular temperature range. But for a variety of reasons, the temperature of the freight is not usually available to the merchant. This leaves the temperature of the freight unaccounted for during transport. Consequently, freight is often spoiled during transport, which can also be costly for merchants.

As a result, there exists a need for improvements over the prior art and more particularly for a more efficient and way of keeping track of freight during transport, and the temperature of freight during transport.

SUMMARY

A cellular global tracker for providing real time data about a current location of freight is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a device for tracking freight is disclosed. The device includes a housing configured for attachment to freight, adhesive disposed on one side of the housing, the adhesive configured for attachment to freight, a cellular network transmitter/receiver located within the housing, a global positioning system (GPS) processor for collecting location data about the device, the GPS processor located within the housing, a temperature sensor for collecting temperature data, the sensor located within the housing, a processor communicatively coupled with the cellular network transmitter/receiver, the GPS processor and the temperature sensor, the processor configured for reading said location data and said temperature data and transmitting said location data and said temperature data via the cellular network transmitter/receiver, and, a power source comprising a battery, the power source conductively coupled to the processor, the cellular network transmitter/receiver, the GPS processor and the temperature sensor.

Additional aspects of the disclosed embodiments will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the claimed device.

BRIEF DESCRIPTION OF THE DRAWINGS

The accompanying drawings, which are incorporated in and constitute part of this specification, illustrate embodiments of the claimed device and together with the description, serve to explain the principles of the claimed device. The embodiments illustrated herein are presently preferred, it being understood, however, that the claimed device is not limited to the precise arrangements and instrumentalities shown, wherein:

FIG. 2A is a block diagram illustrating the main components of the cellular global tracker for providing real time data about a current location of freight, according to an example embodiment;

FIG. 2B is a block diagram illustrating the various layers of the cellular global tracker for providing real time data about a current location of freight, according to an example embodiment;

FIG. 2D is a block diagram depicting the data flow of the process undertaken by the cellular global tracker for providing real time data about a current location of freight, according to an example embodiment;

DETAILED DESCRIPTION

Figure 1:
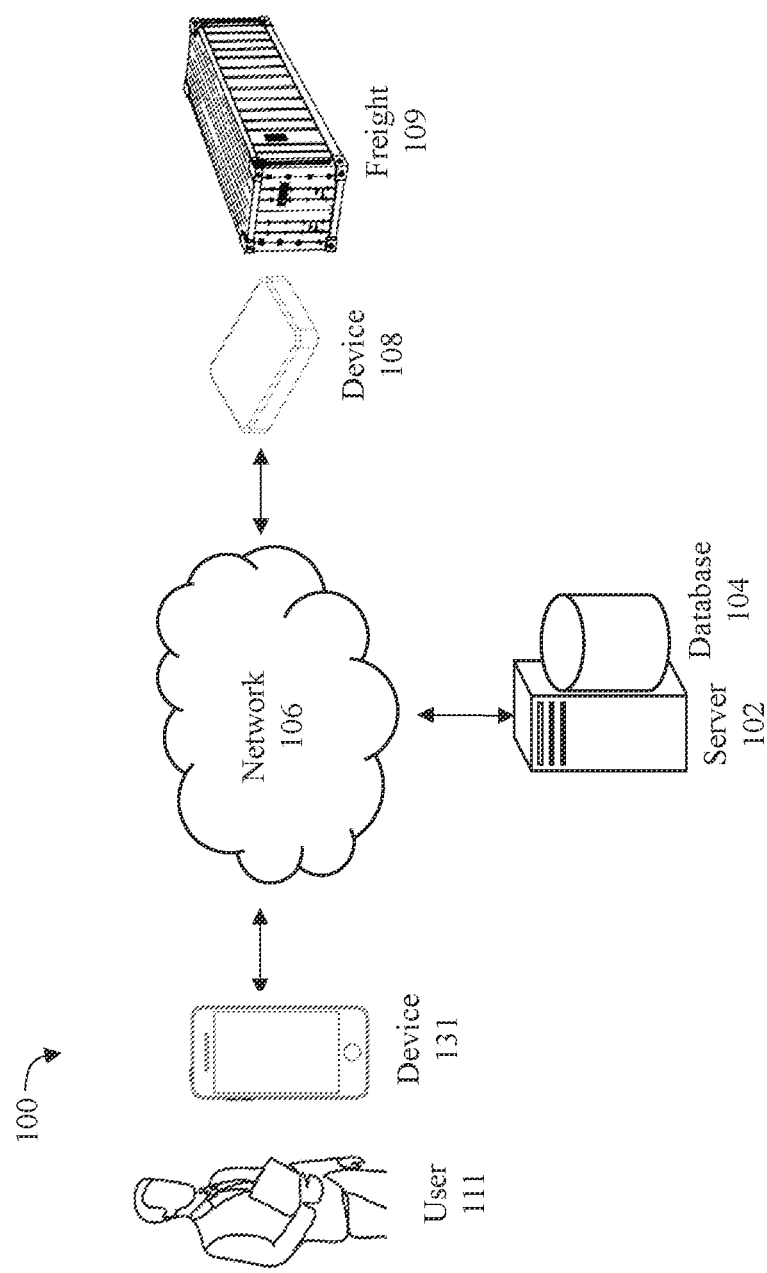
FIG. 1 is a diagram of an operating environment that supports a cellular global tracker for providing real time data about a current location of freight, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a system for easily providing real time data about a current location of freight. The disclosed embodiments improve over the prior art by providing a system that allows for real time uploading of current location data about freight via the cellular network using a small, disposable, battery-powered computing device that is easy and low-cost to manufacture, can be effortlessly attached to freight and sports a diminutive form factor. The disclosed embodiments, due to their diminutive size, are less intrusive than conventional trackers and are highly accurate. The disclosed embodiments improve over the prior art by providing a system that allows eliminates the gap in the information that merchants have about the current location of their freight, thereby reducing instances of freight being lost or misplaced during transport. The disclosed embodiments also improve over the prior art by providing real time temperature data of the freight, thereby reducing freight that is lost or misplaced during transport and reducing damage or other loss to the freight. The disclosed embodiments further improve over the prior art by providing a low-cost, disposable tracking device that is simple and economical to dispose of and replace.

Referring now to the Figures, FIG. 1 is a diagram of an operating environment or system 100 that supports the cellular global tracker 108 for providing real time data about a current location of freight 109, according to an example embodiment. The environment 100 comprises a computing device 108, which may include a small housing (which may be credit card sized, or thereabouts), within which is located various components described below. The device 108 may communicate with server 102 via a communications network 106. Computing device 108 may comprise any computing device, such as integrated circuits, printed circuit boards, processors, ASICs, PCBs, and computers, for example. Computing device 108 may also comprise any mobile computing device.

Computing device 108 may be connected wirelessly to the communications network 106. Communications network 106 may one or more packet switched networks, such as the Internet, or any local area networks, wide area networks, enterprise private networks, cellular networks, phone networks, mobile communications networks, or any combination of the above. Additionally, the connection of the device 108 to the network 106 could be via a cellular apparatus. A cellular system refers to a mobile telephone system that uses a number of short-range radio stations to cover the area that it serves, the signal being automatically switched from one station to another as the user travels about.

FIG. 1 includes computing device 131, which may be a mobile computing device such as smart phones, mobile phones, tablet computers, handheld computers, laptops, or the like. In another embodiment, computing device 131 may be a workstation, desktop computer, server, laptops, all-in-one computer, or the like. Computing device 131 corresponds to a user 111 of the data sharing services of the claimed embodiments and may be an owner or other party that has interest in the freight 109. Device 131 may be communicatively coupled with network 106 in a wired or wireless fashion. FIG. 1 also includes server 102, which may be smart phones, mobile phones, tablet computers, handheld computers, laptops, workstations, desktop computers, servers, laptops, all-in-one computers, or the like.

Server 102 includes a database or repository 104, which may be a relational database comprising a Structured Query Language (SQL) database stored in a SQL server or a database. The database 104 may store location and sensor data received from device 108 during the course of operation of the disclosed embodiments. Various types of data may be stored in the database 104 of server 102. For example, the database 104 may store a plurality of user data corresponding to a user or customer, as well as any data garnered from the device 108, which is described more fully below. Devices 131, 108 may also each include their own database. The repository 104 serves data from a database, which is a repository for data used by server 102 and devices 131, 108 during the course of operation of the disclosed embodiments. Database 104 may be distributed over one or more nodes or locations that are connected via network 106.

The database 104 may include a user record for each user 111. A user record may include contact/identifying information for the user (name, address, telephone number(s), email address, etc.), information pertaining to freight associated with the user, contact/identifying information for entities receiving freight from the user or sending freight to the user, etc. A user record may also include a unique identifier for each user, a residential and business address for each user, the current location of each user (based on location-based services from the user's computer) and a description of freight owned or otherwise related to each user. A user record may also include contact information (email address, name, address, telephone number, etc.) or a unique identifier for one or more entities associated with the user.

The database 104 may include a freight record for each freight 109. A freight record may include information about the owner of the freight, a description of the freight, a sender of the freight, a recipient of the freight, a shipper of the freight, and any other related data, such as metadata. A freight record may also include: a unique identifier, contact/identifying information for the owner of the freight, a description of the freight, an amount of space necessary to store the freight, weight of the freight, volume of the freight, etc. A freight record may also include location data of the freight at the start of a shipping episode, during the shipping episode and at the conclusion of the episode. Location data may include, for example, global coordinates. A freight record may also include sensor data of the freight at the start of a shipping episode, during the shipping episode and at the conclusion of the episode. The sensor data may include temperature data, movement data, humidity data, accelerometer data, barometer data, or the like.

As mentioned above, this communication between device 108 and server 102 may be completed through a packet switched network, such as the Internet, or any local area networks, wide area networks, enterprise private networks, cellular networks, phone networks, mobile communications networks, or any combination of the above. In one embodiment, the communications protocol used to send messages or data to and from server 102 and the network interface device may include any of the communications protocols known in the art, such as HTTP, TCP, UDP, ICMP, FTP, MQTT and IMAP.

Freight 109 may be a dry van, a refrigerated van, a box trailer, or the like. Freight 109 may also be an intermodal container, often called a shipping container, which is a large, standardized shipping container, designed and built for intermodal freight transport, meaning these containers can be used across different modes of transport (ship, rail, or truck) without unloading and reloading their cargo. Intermodal containers can be used to store and transport materials and products efficiently and securely in the global containerized intermodal freight transport system. Freight 109 may also be referred to as a container, cargo or freight container, ISO container, shipping, sea or ocean container, sea van or (Conex) box, container van, sea can, or c can. The intermodal container may be a durable closed steel box, 8 feet (2.4 m) wide and either 20 or 40 feet (6.1 or 12.2 m) long. The height of the intermodal container may be 8 feet 6 inches (2.6 m) or 9 feet 6 inches (2.9 m).

FIG. 1 shows an embodiment wherein networked computing devices 131, 108 interact with server 102 and repository 104 over the network 106. It should be noted that although FIG. 1 shows only the networked computers 131, 108, and 102, the system of the disclosed embodiments supports any number of networked computing devices connected via network 106. Further, server 102, and units 131, 108, include program logic such as computer programs, mobile applications, executable files, or computer instructions (including computer source code, scripting language code or interpreted language code that may be compiled to produce an executable file or that may be interpreted at run-time) that perform various functions of the disclosed embodiments.

Note that although server 102 is shown as a single and independent entity, in one embodiment, the functions of server 102 may be integrated with another entity, such as one of the devices 131, 108. Further, server 102 and its functionality, according to a preferred embodiment, can be realized in a centralized fashion in one computer system or in a distributed fashion wherein different elements are spread across several interconnected computer systems.

FIG. 2A is a block diagram illustrating the main components of the cellular global tracker 108 for providing real time data about a current location of freight, according to an example embodiment. FIG. 1 shows a computing device 108 for providing real time location data and temperature data about freight 109, which may be, for example, a shipping container. The device 108 includes a small housing 107 designed for being attached to freight, the housing including a global positioning system (GPS) computing device 204 for collecting location data about the device 108 and a sensor suite 206 for collecting sensor data from the freight. The housing also includes a cellular network transmitter/receiver 222 (which may include a M2M SIM card or M2M eSI) and a power source 210 comprising a battery, the power source conductively coupled to the cellular network transmitter/receiver 222, the GPS device 204 and the sensor suite 206. Cellular network transmitter/receiver 222 may be a cellular chipset, a cellular module (a package of electronics, inclusive of the chipset), or a cellular modem, all of which include a SIM or eSI. Cellular network transmitter/receiver 222 may operate on the GSM communications standard. Cellular network transmitter/receiver 222 may alternatively operate on the CDMA, 2G, 3G, 4G LTE, 5G communications standards, or the like.

The housing also includes a processor 220 communicatively coupled with the sensor suite 206, the power source 210, cellular network transmitter/receiver 222 and the GPS computing device 204. The processor 220 is configured for receiving said sensor data and said location data from the GPS device 204 and the sensor suite 206 and transmitting said sensor data and said location data to a remote location (i.e., server 102 via network 106) using cellular network transmitter/receiver 222. The processor 204 may be reprogrammable and may be reprogrammed via a serial port, or via commands received via the cellular network transmitter/receiver 222.

Device 108 may further be dust, shock, and water resistant and may measure approximately 80 mm×50 mm×10 mm. The diminutive size of the device is approximately equal to that of a credit card and results in the ability to attach the device quickly and easily to freight, outside a container. Device 108 may further include a SIM card for storing the international mobile subscriber identity (IMSI) number of the device 108 and its related key, and an indicator LED for indicating battery life and/or working status of the device 108. The device 108 comprises inexpensive components and is economical to manufacture, and therefore, the device 108 may considered disposable. I.e., in one embodiment, the device 108 is designed for a single use (or a small number of uses) after which it is recycled or is disposed as solid waste.

The sensor suite 206 may include a temperature sensor that collects temperature data, an accelerometer for collecting movement data, a pressure sensor for collecting pressure data, a barometer for collecting barometric data and a humidity sensor for collecting data about ambient humidity. The device 108 may further include a serial port for inputting and outputting data from the device 108 (such as for debugging, middle ware updating, firmware updating, etc.), a real time clock (such as a CMOS clock) and one or more external buttons or switches for interfacing with a user.

FIG. 2B is a block diagram illustrating the various layers of the cellular global tracker 108 for providing real time data about a current location of freight, according to an example embodiment. FIG. 2B shows that the device 108 includes a housing top cover 250, a printed circuit board assembly (PCBA) 252 (which includes a variety of components described herein), a rechargeable battery 254, a housing bottom cover 256 and an adhesive tape 258, which may be a double sided, foam adhesive tape. In one embodiment, the housing 107, the bottom cover 256 and top cover 250 may be composed of plastic. The rechargeable battery, which may be removable, may include a power port or a battery terminal that allows for the connection of a power source for recharging the battery. The device 108 may further include a battery charging system that includes all necessary hardware components for recharging the rechargeable battery using an external current source connected to the device 108 via the power port or battery terminal. In one embodiment, the rechargeable battery 254 is configured for regular operation of the device 108 for at least 15 hours of use at full charge.

FIG. 2B further shows a pull tab 260 which comprises a tab that is pulled from the device 108 to activate the battery, so as to activate the device to being operation. The battery insulating pull tab 260 is configured to be removed from the battery compartment even if the compartment is closed. The battery insulating pull tab 260 will protect the battery and circuitry during shipping and handling, and is made from a thin, flexible, strong polyester so the insulator can be pulled from the battery compartment even if the compartment is closed.

Figure 2C:
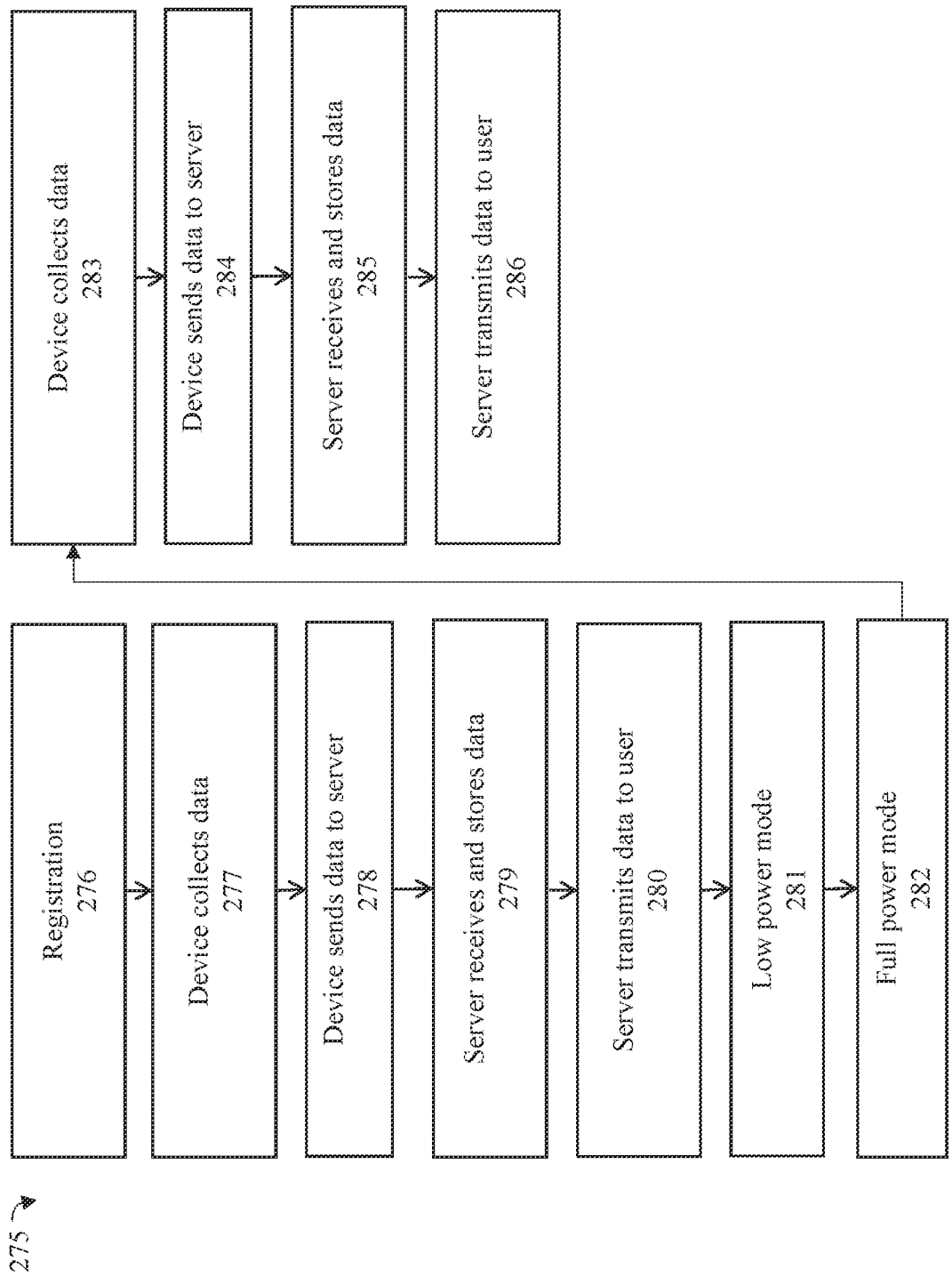
FIG. 2C is a flowchart depicting the control flow of the process undertaken by the cellular global tracker for providing real time data about a current location of freight, according to an example embodiment.

The process of globally tracking freight 108 over a communications network will now be described with reference to FIGS. 2C-2D below. FIG. 2C is a flowchart depicting the control flow of the process undertaken by the cellular global tracker 108 for providing real time data about a current location of freight 109, according to an example embodiment. FIG. 2D is a block diagram depicting the data flow of the same process. The process of the disclosed embodiments begins with optional step 276 (see process or flowchart 275), wherein the user 111 may enroll or register with server 102. In the course of enrolling or registering, the user may enter data into his device 131 by manually entering data into an application via keypad, touchpad, or via voice. In the course of enrolling or registering, the user may enter any data that may be stored in a user record, as defined above. Also, in the course of enrolling or registering, the server 102 may generate a user record for the user 111 and store the user record in an attached database, such as database 104. The step of enrolling or registering entails enrolling or registering the user 111 and/or device 108 with the server 102.

In the next step 277, a first module executing on the device 108 communicably coupled to the communications network 106 automatically reads sensor readings from its sensors, reads location data from the GPS module 204, takes a time stamp, and combines all of the foregoing in a data packet 288. In step 278, the first module executing on the device 108 automatically transmits said data 288 (which may be transmitted via an HTTP request that includes a unique identifier for the device 108) to server 102 over the communications network.

In step 279, a module on the server 102 automatically stores said data 288 in a freight record and/or a user record. Subsequently, in step 280, the server 102 automatically transmits data 289 to the device 131 of user 111 via the network 106 (such as via an HTTP request). Data 289 may include the same data as data 288. In one embodiment, the steps 277 through 280 are performed periodically, such as every 30 minutes.

In step 281, a second module executing on the device 108 detects little or no movement (via the accelerometer), and therefore, enters into low power mode, which is a mode of operation that reduces functionality to optimize battery performance. For example, in low power mode, certain sensors (such as the temperature sensor), and certain non-essential functions of the processor, may be deactivated to conserve power. In step 282, the second module executing on the device 108 detects movement using its sensors and wakes up the device 108, i.e., enters into full power mode, which is a mode of operation that increases functionality to optimize device operation. For example, in full power mode, all sensors, and all functions of the processor, may be activated to optimize the function of the device. In one embodiment, the processor is configured to activate low power mode of the device when the accelerometer detects absence of movement for a predefined period of time, such as 30 minutes.

In the next step 283, the first module executing on the device 108 communicably coupled to the communications network 106 automatically reads sensor readings from its sensors, reads location data from the GPS module 204, takes a time stamp, and combines all of the foregoing in a data packet 290. In step 284, the first module executing on the device 108 automatically transmits said data 290 (which may be transmitted via an HTTP request that includes a unique identifier for the device 108) to server 102 over the communications network.

In step 285, a module on the server 102 receives and automatically stores said data 290 in a freight record and/or a user record. Subsequently, in step 286, the server 102 automatically transmits data 291 to the device 131 of user 111 via the network 106 (such as via an HTTP request). Data 291 may include the same data as data 290.

Figure 3:
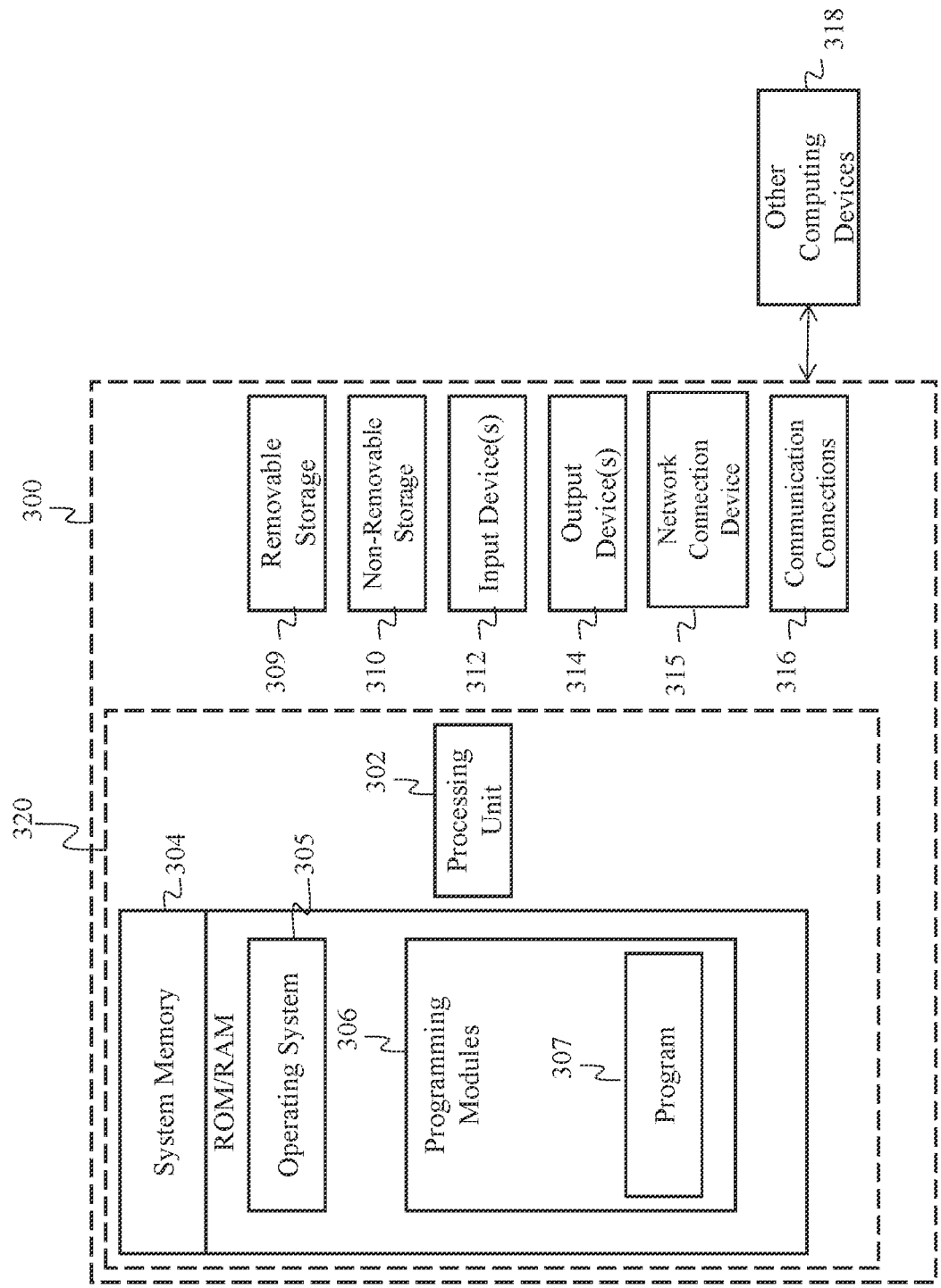
FIG. 3 is a block diagram of a computing device, according to an example embodiment.

FIG. 3 is a block diagram of a system including an example computing device 300 and other computing devices. Consistent with the embodiments described herein, the aforementioned actions performed by device 108, device 131 or server 102 may be implemented in a computing device, such as the computing device 300 of FIG. 3. Any suitable combination of hardware, software, or firmware may be used to implement the computing device 300. The aforementioned system, device, and processors are examples and other systems, devices, and processors may comprise the aforementioned computing device. Furthermore, computing device 300 may comprise an operating environment for device 108 and/or device 102, as described above.

With reference to FIG. 3, a system consistent with an embodiment of the invention may include a plurality of computing devices, such as computing device 300. In a basic configuration, computing device 300 may include at least one processing unit 302 and a system memory 304. Depending on the configuration and type of computing device, system memory 304 may comprise, but is not limited to, volatile (e.g. random-access memory (RAM)), non-volatile (e.g. read-only memory (ROM)), flash memory, or any combination or memory. System memory 304 may include operating system 305, and one or more programming modules 306. Operating system 305, for example, may be suitable for controlling computing device 300's operation. In one embodiment, programming modules 306 may include, for example, a program module 307 for executing the actions of devices 108, 131, 102, for example. Furthermore, embodiments of the invention may be practiced in conjunction with a graphics library, other operating systems, or any other application program and is not limited to any particular application or system. This basic configuration is illustrated in FIG. 3 by those components within a dashed line 320.

Computing device 300 may have additional features or functionality. For example, computing device 300 may also include additional data storage devices (removable and/or non-removable) such as, for example, field-programmable gate array (FPGA), high-speed flash memory, magnetic disks, optical disks, or tape. Such additional storage is illustrated in FIG. 3 by a removable storage 309 and a non-removable storage 310. Computer storage media may include volatile and nonvolatile, removable and non-removable media implemented in any method or technology for storage of information, such as computer readable instructions, data structures, program modules, or other data. System memory 304, removable storage 309, and non-removable storage 310 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 300. Any such computer storage media may be part of device 300. Computing device 300 may also have input device(s) 312 such as a keyboard, a mouse, a pen, a sound input device, a camera, a touch input device, etc. Output device(s) 314 such as a display, speakers, a printer, etc. may also be included. The aforementioned devices are only examples, and other devices may be added or substituted.

Computing device 300 may also contain a network connection device 315 (also known as a network interface device, network interface controller, network interface connection, etc.) that may allow device 300 to communicate with other computing devices 318, such as over a network in a distributed computing environment, for example, an intranet or the Internet. Device 315 may be a wired or wireless network interface controller, a network interface card, a network interface device, a network adapter or a LAN adapter. Device 315 allows for a communication connection 316 for communicating with other computing devices 318. Communication connection 316 is one example of communication media.

Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 304, including operating system 305. While executing on processing unit 302, programming modules 306 (e.g. program module 307) may perform processes including, for example, one or more of the stages of the process described above. The aforementioned processes are examples, and processing unit 302 may perform other processes. Other programming modules that may be used in accordance with embodiments disclosed herein.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general-purpose computer or in any other circuits or systems.

Embodiments of the invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A device for tracking freight, comprising:
    a housing configured for attachment to freight, wherein the housing is sized approximately 80 mm×50 mm×10 mm;
    adhesive disposed on one side of the housing, the adhesive configured for attachment to freight;
    a cellular network transmitter/receiver located within the housing;
    a global positioning system (GPS) processor for collecting location data about the device, the GPS processor located within the housing;
    a temperature sensor for collecting temperature data, the sensor located within the housing;
    a processor communicatively coupled with the cellular network transmitter/receiver, the GPS processor and the temperature sensor, the processor configured for reading said location data, said temperature data and transmitting said location data and said temperature data via the cellular network transmitter/receiver every 30 minutes, and entering into lower power mode after a period of inactivity;
    a power source comprising a battery in a battery compartment having an open and closed orientation, the power source conductively coupled to the processor, the cellular network transmitter/receiver, the GPS processor and the temperature sensor;
    an L-shaped pull tab located in the battery compartment, the L-shaped pull tab composed of an insulating polyester material, the L-shaped pull tab configured to protect the battery during shipping and configured to activate the battery when pulled, wherein the L-shaped pull tab is configured to be pulled from the battery compartment when the battery compartment is in the closed orientation; and an LED light on an exterior of the housing, the LED light configured for indicating battery life and working status of the device.

2. The device of claim 1, wherein the processor is re-programmable.

3. The device of claim 2, wherein the battery may be removable or rechargeable.

4. The device of claim 3, wherein the housing is composed of plastic.

5. A device for tracking freight, comprising:
a housing configured for attachment to freight, wherein the housing is sized approximately 80 mm×50 mm×10 mm;
adhesive disposed on one side of the housing, the adhesive configured for attachment to freight;
a cellular network transmitter/receiver located within the housing;
a global positioning system (GPS) processor for collecting location data about the device, the GPS processor located within the housing;
a temperature sensor for collecting temperature data, the sensor located within the housing;
a processor communicatively coupled with the cellular network transmitter/receiver, the GPS processor and the temperature sensor, the processor configured for reading said location data and said temperature data and transmitting said location data, said temperature data, a timestamp via the cellular network transmitter/receiver every 30 minutes, and entering into lower power mode after a period of inactivity;
a power source comprising a battery in a battery compartment having an open and closed orientation, the power source conductively coupled to the processor, the cellular network transmitter/receiver, the GPS processor, and the temperature sensor;
an L-shaped pull tab located in the battery compartment, the L-shaped pull tab composed of an insulating polyester material, the L-shaped pull tab configured to protect the battery during shipping and configured to activate the battery when pulled, wherein the L-shaped pull tab is configured to be pulled from the battery compartment when the battery compartment is in the closed orientation;
an LED light on an exterior of the housing, the LED light configured for indicating battery life and working status of the device.

6. The device of claim 5, wherein the processor is re-programmable.

7. The device of claim 6, wherein the battery may be removable or rechargeable.

8. The device of claim 7, wherein the housing is composed of plastic.

9. A device for tracking freight, comprising:
a housing configured for attachment to freight, wherein the housing is sized approximately 80 mm×50 mm×10 mm;
adhesive disposed on one side of the housing, the adhesive configured for attachment to freight;
a cellular network transmitter/receiver located within the housing;
a global positioning system (GPS) processor for collecting location data about the device, the GPS processor located within the housing;
a temperature sensor for collecting temperature data, the sensor located within the housing;
an accelerometer for collecting movement data;
a processor communicatively coupled with the cellular network transmitter/receiver, the GPS processor and the temperature sensor, the processor configured for reading said location data and said temperature data and transmitting said location data, said temperature data, a timestamp via the cellular network transmitter/receiver every 30 minutes, and entering into lower power mode after a period of inactivity;
a power source comprising a battery in a battery compartment having an open and closed orientation, the power source conductively coupled to the processor, the cellular network transmitter/receiver, the GPS processor, and the temperature sensor;
wherein the processor is further configured to activate a low power mode of the device when the accelerometer detects absence of movement for a predefined period of time;
an L-shaped pull tab located in the battery compartment, the L-shaped pull tab composed of an insulating polyester material, the L-shaped pull tab configured to protect the battery during shipping and configured to activate the battery when pulled, wherein the L-shaped pull tab is configured to be pulled from the battery compartment when the battery compartment is in the closed orientation; and
an LED light on an exterior of the housing, the LED light configured for indicating battery life and working status of the device.

10. The device of claim 9, wherein the processor is re-programmable.

11. The device of claim 10, wherein the battery may be removable or rechargeable.

12. The device of claim 11, wherein the housing is composed of plastic.

* * * * *